United States Patent [19]

Shibukawa et al.

[11] 3,861,372
[45] Jan. 21, 1975

[54] ELECTRICAL ADVANCE DEVICE FOR AN IGNITION TIMING

[75] Inventors: Suetaroo Shibukawa, Katsuta; Osamu Takahashi, Susono, both of Japan

[73] Assignee: Hitachi, Ltd., Tokyo, Japan

[22] Filed: Jan. 22, 1973

[21] Appl. No.: 325,756

[30] Foreign Application Priority Data
Jan. 2, 1972    Japan.................................. 48-7606

[52] U.S. Cl....................... 123/148 E, 123/148 MC
[51] Int. Cl............................................. F02p 1/00
[58] Field of Search........ 123/148 E, 149 D, 117 R, 123/149 C

[56] References Cited
UNITED STATES PATENTS

| | | | |
|---|---|---|---|
| 3,405,347 | 10/1968 | Swift | 123/148 E |
| 3,447,521 | 6/1969 | Piteo | 123/148 E |
| 3,484,677 | 12/1969 | Piteo | 123/148 E |
| 3,630,185 | 12/1971 | Struber | 123/148 E |

Primary Examiner—Charles J. Myhre
Assistant Examiner—Ronald B. Cox
Attorney, Agent, or Firm—Craig & Antonelli

[57] ABSTRACT

Electrical advance control device for controlling the ignition timing of the ignition circuit of an internal combustion engine having a pulse generating means for generating positive and negative pulses with a different timing, a positive pulse rectifier means for triggering the ignition circuit in accordance with the positive pulse, a negative pulse rectifier means for triggering the ignition circuit in accordance with the negative pulse and a controlling means for controlling the operations of said positive and negative pulse rectifier means in response to the engine speed. It is assumed that the negative timing pulse is generated at an earlier time than that of the positive pulse. When the engine speed is at a low level, the operation of the negative pulse rectifier means is stopped by the operation of the controlling means so that the ignition timing is determined by the timing of the positive pulses. When the engine speed is at a low level, the ignition timing is determined by the positive pulse timing. Therefore, said ignition timing is advanced in response to the engine condition from the timing of the positive pulse to the timing of the negative pulse.

14 Claims, 8 Drawing Figures

ELECTRICAL ADVANCE DEVICE FOR AN IGNITION TIMING

BACKGROUND OF THE INVENTION

1. Field of the Invention

This invention relates to an electrical timing advance device for controlling an ignition timing of an internal combustion engine.

2. Description of the Prior Art

One conventional advance control device is provided in the form of a mechanical assembly having a diaphragm connected with the intake manifold of the engine and a timing plate on which a timing pulse generator is fixed. The pulse generator generates timing pulses for ignition with a timing determined by the angular relation between the position of a pick-up coil of the generator and a magnet which is rotated by the engine through a gear assembly. In order to change the timing of the voltage pulse from said generator in response to engine load conditions or engine speed, it is necessary that the timing plate be shifted by the diaphragm. Such a mechanical assembly is complicated and therefore its price becomes expensive.

Recently, the use of an electrical advancing device has been proposed. This device has two generators connected with the engine shaft. These generators generate two sets of positive pulses. The voltage level of one set of positive pulses is higher than that of the other set of positive pulses. At first the small positive pulse is generated at the first pulse generator and then the large positive pulse is generated at the second pulse generator. A trigger circuit for triggering an ignition circuit is operated when an input voltage of the trigger circuit exceeds a predetermined voltage level.

When the engine speed is at a low level, since these pulses are relatively low level, only the large positive pulse exceeds the predetermined level for triggering the ignition circuit. In the high engine speed condition, since these two kinds of pulses become relatively high level, both of the two positive pulses exceed that level and operate the trigger circuit. Therefore, the ignition timing is advanced for an angle determined by the difference between the first and second position angles. In this device two kinds of generators and two kinds of rectifiers are needed for producing the two kinds of positive pulses. Thus, this device is also very complicated and expensive.

SUMMARY OF THE INVENTION

An object of the present invention is to provide a simple and low-priced advance device.

A second object of the present invention is to provide an advance device which can be operated by only one generator.

Further objects and advantages of the present invention will be apparent from the following description.

The advance device in accordance with the present invention has a pulse generator which generates positive and negative voltage waves with a different timing, a positive pulse rectifier means which causes an output in accordance with said positive wave and a negative pulse rectifier means which causes an output in accordance with said negative wave. Assuming that the negative voltage wave is caused at a more advanced position than the positive position, the output of the negative pulse rectifier means will be advanced in position with respect to the positive pulse rectifier means.

When the engine speed is changed to a high level from a low level, it is necessary to advance the ignition timing of the engine, as is well known. The negative voltage wave is generated at a suitable timing for an ignition timing of the high engine speed and the positive voltage wave is generated at a suitable timing for the low engine speed. When the engine speed is at a low level, the positive pulse rectifier means is operated for triggering the ignition circuit in accordance with the positive voltage wave. When the engine speed is changed to a high level, the negative pulse rectifier means is operated for triggering the ignition circuit in accordance with the negative voltage wave.

The control of the operations of said positive and negative pulse rectifier means is effected by control means, such as thyristors, transistors or other switching elements, which is operated in response to the engine speed. When the engine speed is at a low level, the control means stops the operation of the negative pulse rectifier means by way of disconnection of the input of the negative pulse rectifier means, disconnection of the input circuit thereof or disconnection of the output.

It is possible to form the positive and negative pulse rectifier means with rectifier circuits for making use of simple circuits. In this case, the negative and positive pulse rectifier means are operated as a half-wave rectifier at low engine speed levels and operated as a full-wave rectifier at high engine speed levels. The half-wave rectifier passes only one polarity of voltage, positive or negative. Therefore, at low engine speed levels only the positive wave is applied to an input of the ignition circuit through a suitable wave forming circuit and at high engine speed levels both the negative and positive waves are applied for triggering the ignition circuit with negative voltage timing.

In the above explanation, it is assumed that the advance is determined only by engine speed. But it is possible that the ignition timing is changed in accordance with manifold suction. The operations of the negative and positive pulse rectifier means are controlled in such case in response to an output of a diaphragm communicating with the intake manifold. The advance of the ignition timing of this case is determined both in accordance with the engine load conditions and in accordance with the engine speed conditions.

In the standard ignition circuit, the discharge current of a capacitor causes a spark across the spark gap of a spark plug; however, the spark cannot be generated until the capacitor has stored a sufficient charge. When both pulses from the positive and negative pulse rectifier means are applied to the ignition circuit, the spark is caused in accordance with only the earlier pulse, and is independent of the later pulse. Therefore, it is possible to provide for advance of the ignition timing to control only the pulse rectifier means which causes an output in accordance with the earlier voltage wave, and the other acting means is always operated.

Our invention is characterized by the fact that the pulse generator generates positive and negative voltage waves. In a with pulse generator, it is very easy to generate a plurality of pulses including positive and negative pulses. It is difficult to generate a plurality of pulses including only positive pulses or only negative pulses. The present invention uses both positive and negative pulses. For example, a field flux density of a field magnet of a generator is changed or the direction of a flux density is changed. The direction of an output voltage of a pulse generator is changed at the flux density changing position. The flux density change is caused by providing a plurality of cutouts on the field magnets of the pulse generator. The value of the advancing angle is controlled by changing the distance between said cutting portions.

DETAILED DESCRIPTION OF THE PREFERRED EMBODIMENT

Figure 1:
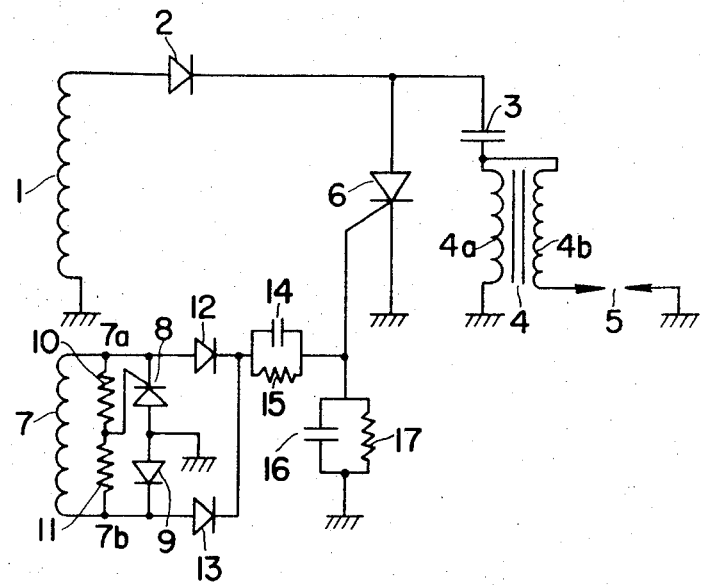
FIG. 1 is a schematic circuit diagram of an advance device in accordance with one embodiment of the present invention.

Referring to FIG. 1, an output coil 1 of a generator is connected to primary coil 4a of an ignition transformer 4 through a diode 2 and a capacitor 3, the other end of coil 4a being connected to ground. A secondary coil 4b is connected at one end to capacitor 3 and at the other end to a spark plug 5. A thyristor 6 is connected between the cathode of the diode 2 and ground for forming a closed circuit with the capacitor 3 and the transformer 4. The electric energy provided from the output coil 1 of the generator is stored in the capacitor 3 after passing through the diode 2. Thus, when thyristor 6 is switched on, the energy of the capacitor 3 is discharged through the thyristor and the primary coil 4a of the transformer 4. As a result, a high voltage is applied to the spark plug 5 from the second coil 4b. Therefore, the timing of the ignition is determined by the switching timing of the thyristor 6.

An output coil 7 of a pulse generator is connected to a rectifier circuit comprising diodes 9, 12, and 13 and a thyristor 8. The gate of the thyristor 8 is connected to the junction point of the dividing resistors 10 and 11. A parallel circuit of a capacitor 14 and a resistor 15 is connected between an output terminal of the rectifier circuit and the gate of the thyristor 6. Another parallel circuit of a capacitor 16 and a resistor 17 is connected between ground and the gate of the thyristor 6.

Figure 2:
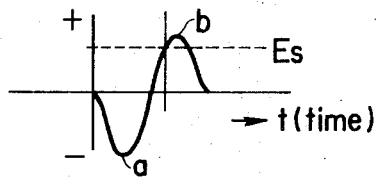
FIG. 2 is a diagram of output voltage waves from the pulse generator of FIG. 1.

The pulse voltage generated between the output terminals 7a and 7b of the coil 7 is shown in FIG. 2, this voltage being used for determining the triggering timing of the thyristor 6. At first the potential of terminal 7b is higher than that of the terminal 7a. When the engine speed is at a low level, the thyristor 8 is cut off because the potential of the gate thereof is not sufficient for switching the thyristor on; therefore, the current path of negative polarity current cannot be completed through the thyristor 8. When the potential of the terminal 7a is higher than that of the terminal 7b, the current is caused to flow from terminal 7a through the diode 12, the capacitor 14, the gate and the anode of the thyristor 6, ground, and the diode 9 to the terminal 7b. The ignition timing is then determined by the timing of the positive pulse b, as shown in FIG. 2.

Figure 3:
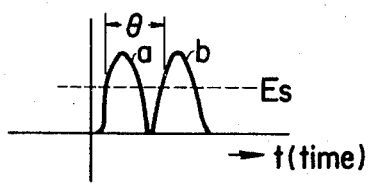
FIG. 3 is a diagram of an output voltage wave from the rectifier circuit of FIG. 1 when the engine speed is at a high level.

When the engine speed exceeds a predetermined level, the thyristor 8 is turned on because the gate potential becomes sufficiently high for switching on the thyristor 8. As a result, the thyristor 6 is turned on by the negative pulse a, by current flowing from terminal 7b through diode 13, capacitor 14, the gate and anode of thyristor 6, ground, and thyristor 8 to terminal 7a, as shown in FIG. 2. Namely, the rectifier circuit of FIG. 1 applies two positive outputs a and b, as shown in FIG. 3, to the capacitor 16 through the parallel circuit of the capacitor 14 and the resistor 15. The voltage stored by the capacitor 16 exceeds a predetermined level $E_S$ and the thyristor 6 is turned on. Since almost all of the energy of the capacitor 3 is discharged in providing an ignition spark by switching of the thyristor 6 in response to the pulse a, the later pulse b cannot provide an ignition spark.

The advance device as shown in FIG. 1 consists of a pulse generator for generating positive and negative pulses at different times, a positive pulse rectifier means for causing an output in accordance with the positive pulse, a negative pulse rectifier means for causing an output in accordance with the negative pulse and control means for selecting the output for triggering the ignition circuit from said positive or negative pulse rectifier means in accordance with the engine speed condition.

Said positive pulse rectifier means consists of the diodes 9 and 12 and the thyristor 8, and said negative pulse rectifier means consists of the diode 13. But it is possible to form these means from other elements. For example, the terminals 7a and 7b can be connected respectively to the bases of NPN and PNP type transistors through the controlling means which controls the operation of said transistors. Outputs of these transistors are applied to the input of the ignition circuit through suitable circuits for arranging wave forms.

The advance device of FIG. 1 is very simple because the positive and negative pulse rectifier means can be formed by rectifier circuits. When the engine speed is at a low level, the pulse rectifier means become a half-wave rectifier, and when the engine speed is at a high level, the pulse rectifier means become a full-wave rectifier. The changing from the half-wave rectifier operation to the full-wave rectifier operation is caused by the controlling means consisting of the resistors 10, 11 and the thyristor 8. Thus, the thyristor 8 is used both as a rectifier and a controlling means.

The potential of the gate of the thyristor 8 is varied in accordance with the engine speed. Namely, the pulse generator having the coil 7 and the dividing resistors 10, 11 are also used as an engine speed detector. If there is a voltage which is varied in response with engine speed, that voltage can be used as an input to the gate of the thyristor. It is possible to apply to the gate of thyristor 8 an output from another generator which is also provided for other purposes or only for triggering the thyristor 8.

Figure 4:
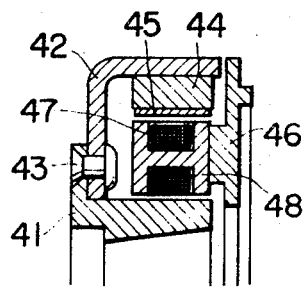
FIG. 4 is a sectional view of an embodiment of the pulse generator of FIG. 1.

FIG. 4 illustrates a structural example of the pulse generating device. A hub 41 having a flywheel 42, a plurality of magnets 44 (only one magnet being shown) and a pole piece 45 is secured at an engine shaft. A rivet 43 is provided for fixing the flywheel 42 on the hub. An H-shaped iron core 48 having a pulse generating coil 47 is fixed in a base 46. When the hub 41 is rotated by the engine, the coil 47 coupled with the magnets 44 causes pulse outputs.

Figure 5A:
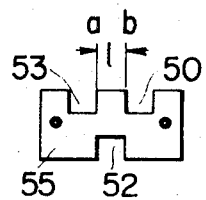
FIGS. 5a and 5b are detail views of pole pieces of the pulse generator of FIG. 4.
Figure 5B:
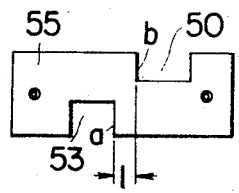
Figure 6:
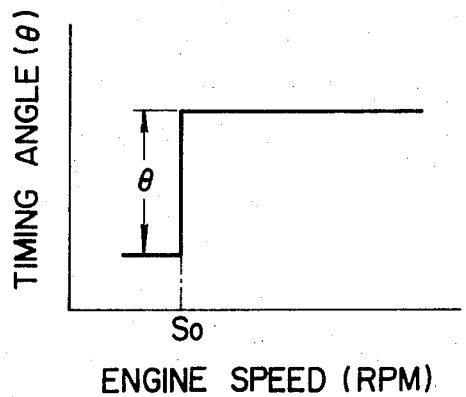
FIG. 6 is a diagram of an advance condition characteristic of an ignition timing.

The form of the pole piece 45 is shown in FIG. 5a or FIG. 5b. The pole piece 55 has cutouts 50, 52, and 53 for changing the flux density. When the H-shaped iron core 48 comes adjacent to the pole piece 55, at an edge of the cutout 53, the negative pulse a, as shown in FIG. 2, is generated in the coil 47 and at an edge b of the cutout 50, the positive pulse b is generated. The angle between the pulses a and b as shown in FIG. 3 is determined by the distance $l$ between the edges a and b of the cutouts. Then, the angle $\theta$ to be advanced is controlled by changing the distance $l$. The changing of the advance is controlled by the engine speed, as explained above. This operation is shown in FIG. 6. When the engine speed reaches the predetermined value $S_0$, the gate potential of the thyristor 8 reaches a sufficiently high level to breakdown the thyristor.

Figure 7:
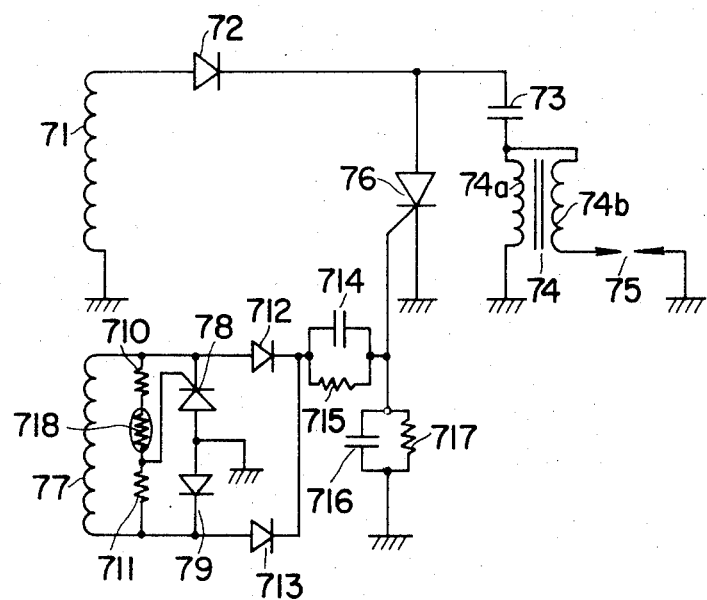
FIG. 7 is a schematic circuit diagram of another embodiment of an advance device in accordance with the invention.

The switching characteristics of the thyristor is affected by environmental temperature. Then the predetermined point is changed by the environmental temperature. In order to cover up this fault, a thermistor 718 is connected between the resistor 710 and the gate of the thyristor 78, as shown in FIG. 7. This ignition circuit has a generting coil 71, a diode 72, a thyristor 76, a capacitor 73, a spark plug 75 and a transformer 74 having a primary coil 74a and a secondary coil 74b, and operation thereof is similar to the circuit of FIG. 1. The advance control circuit includes a pulse generating coil 77, resistors 710, 711, 715, and 717, diodes 79, 712, and 713, capacitors 714 and 716, a thyristor 78 and the thermistor 718. When the temperature is increased, the resistance of the thermistor 718 is decreased. As a result, the thyristor is always triggered at the predetermined engine speed independent of said environmental temperature. If the thermistor has characteristics in which its resistance is increased with increase of the environmental temperature, that thermistor is connected between the resistor 711 and the gate of the thyristor 78.

What is claimed is:

1. An advance control device for controlling an ignition timing of the ignition circuit for an internal combustion engine comprising:
   a pulse generator for generating positive and negative pulses with different timing;
   rectifier means including positive pulse rectifier means for passing the positive pulses and negative pulse rectifier means for passing the negative pulses generated by said pulse generator;
   speed detecting means for detecting engine speed; and
   means for changing the operation of said rectifier means to that of a full-wave rectifier from that of a half-wave rectifier in response to the output from said speed detecting means.

2. An advance control device as defined in claim 1, wherein said pulse generator includes a coil providing a substantially sinusoidal output voltage, said positive pulse rectifier means including a first diode and a second diode respectively connected to opposite ends of said coil and being poled in the same direction along a current path through said coil, the ends of said first and second diodes opposite said coil being connected to said ignition circuit, said negative pulse rectifier means including a thyristor connected in series opposition with said second diode across said coil, the gate electrode of said thyristor being connected to a voltage dividing circuit across said coil, and a third diode connected between the opposite end of said first diode and the connection of said coil and said second diode.

3. An advance control device according to claim 1 wherein said negative pulse rectifier means includes a thyristor and wherein the gate of said thyristor is connected to said pulse generator through a resistor.

4. An advance control device according to claim 3 wherein said negative and positive pulse rectifier means are connected to the input of the ignition circuit through a pulse circuit for forming a pulse applied to said ignition input terminal in response to an output of said respective pulse rectifier means.

5. An advance control device in accordance with claim 1 wherein said positive and negative pulse rectifier means include three diodes and a thyristor in a bridge circuit and input terminals connected to output terminals of said pulse generator, the gate of the thyristor being connected to the output terminal of said pulse generator through a voltage dividing resistor.

6. An advance control device as defined in claim 2 wherein said ignition circuit includes a timing thyristor for controlling ignition timing, and charge storage means including at least one capacitor connected to said first and third diodes and the gate electrode of said timing thyristor for gating said timing thyristor in response to the first voltage pulse received via said first and third diodes.

7. An advance control device as defined in claim 6 wherein a voltage dividing circuit includes a temperature variable resistor.

8. An advance control device for controlling the ignition timing of an ignition circuit of an internal combustion engine comprising:
   first means for generating first and second electrical signals having respective opposite polarities separated from each other with respect to time; and
   second means for applying said first electrical signal to said ignition circuit in response to a first prescribed engine condition, and for rectifying said second electrical signal and applying at least said rectified second electrical signal to said ignition circuit in response to a second prescribed engine condition;
   wherein said second means comprises a controlled rectifier circuit which effects half-wave rectification of said first and second electrical signals in response to said first prescribed engine condition and which effects full-wave rectification of said first and second electrical signals in response to said second prescribed engine condition.

9. An advance control device according to claim 8, wherein said second means comprises means for detecting the speed of said engine, said first prescribed engine condition corresponding to a relatively low engine speed and said second prescribed engine condition corresponding to a relatively high engine speed.

10. An advance control device according to claim 9, wherein said controlled rectifier circuit comprises three diodes and a thyristor forming a bridge circuit, connected between said first means and said ignition circuit, the control electrode of said thyristor being coupled to said engine speed detecting means.

11. An advance control device according to claim 10, including a voltage dividing resistor circuit connected across said first means, the control electrode of said thyristor being connected to said voltage dividing resistor.

12. An advance control device according to claim 11, wherein said voltage dividing resistor circuit includes a temperature variable resistance element.

13. An advance control device according to claim 8, wherein said first means comprises an electromagnet having a coil rotatably and magnetically coupled to a pole piece, the configuration of said pole piece defining the advance angle of said ignition circuit.

14. An advance control device according to claim 13 wherein said pole piece has respective cut-out and solid portions adjacent each other, the distance separating respective cut-out portions from each other determining the advance angle of said ignition circuit.

* * * * *